United States Patent
Zhou et al.

(10) Patent No.: US 12,270,489 B2
(45) Date of Patent: Apr. 8, 2025

(54) ELECTRIC VALVE AND ASSEMBLY METHOD THEREFOR

(71) Applicant: HANGZHOU SANHUA RESEARCH INSTITUTE CO., LTD., Zhejiang (CN)

(72) Inventors: Lei Zhou, Zhejiang (CN); Yiyuan Pan, Zhejiang (CN); Liwei Wu, Zhejiang (CN)

(73) Assignee: HANGZHOU SANHUA RESEARCH INSTITUTE CO., LTD, Zhejiang (CN)

( * ) Notice: Subject to any disclaimer, the term of this patent is extended or adjusted under 35 U.S.C. 154(b) by 271 days.

(21) Appl. No.: 17/912,092

(22) PCT Filed: Feb. 26, 2021

(86) PCT No.: PCT/CN2021/077996
§ 371 (c)(1),
(2) Date: Sep. 16, 2022

(87) PCT Pub. No.: WO2021/185048
PCT Pub. Date: Sep. 23, 2021

(65) Prior Publication Data
US 2023/0160497 A1    May 25, 2023

(30) Foreign Application Priority Data

Mar. 16, 2020 (CN) .......................... 202010179491.6
Mar. 23, 2020 (CN) .......................... 202020380324.3

(51) Int. Cl.
*F16K 31/04* (2006.01)
*B60H 1/00* (2006.01)
(Continued)

(52) U.S. Cl.
CPC .......... *F16K 41/04* (2013.01); *B60H 1/00485* (2013.01); *F16K 31/047* (2013.01); *F25B 41/35* (2021.01)

(58) Field of Classification Search
CPC .......... F16K 31/047; F16K 31/04; F16K 1/46; B60H 1/00485; Y02B 30/70; F25B 41/35
See application file for complete search history.

(56) References Cited

U.S. PATENT DOCUMENTS

| 2004/0036044 A1 | 2/2004 | Hirota |
| 2006/0175565 A1 | 8/2006 | Nungesser et al. |

(Continued)

FOREIGN PATENT DOCUMENTS

| CN | 206054875 A | 3/2017 |
| CN | 108119699 A | 6/2018 |

(Continued)

OTHER PUBLICATIONS

International Search Report dated Apr. 16, 2021 for PCT Appl. No. PCT/CN2021/077996.

(Continued)

*Primary Examiner* — Kelsey E Cary
(74) *Attorney, Agent, or Firm* — Ohlandt, Greeley and Perle, L.L.P.

(57) ABSTRACT

An electric valve, comprising a stator assembly, a valve component, a valve body, a first sealing member and a sleeve; the stator assembly is located at the periphery of the sleeve and is limitingly connected to the valve body; the stator assembly is provided with a first recessed part, which is located between the valve component and the stator assembly; at least part of the opening of the first recessed part faces toward the valve body, and the first sealing member is located in the recessed part.

18 Claims, 6 Drawing Sheets

(51) Int. Cl.
  *F16K 41/04* (2006.01)
  *F25B 41/35* (2021.01)

(56) References Cited

U.S. PATENT DOCUMENTS

2019/0178404 A1\*  6/2019  Zhang ................. F16K 37/0041
2020/0240539 A1    7/2020  Lan et al.

FOREIGN PATENT DOCUMENTS

| CN | 109424777 | A  | 3/2019  |
| CN | 109707892 | A  | 5/2019  |
| CN | 209876100 | U  | 12/2019 |
| CN | 110701356 | A  | 1/2020  |
| CN | 210035961 | U  | 2/2020  |
| EP | 3026373   | A1 | 6/2016  |
| JP | 2004076920 | A | 3/2004  |
| JP | 5982168   | B2 | 8/2016  |

OTHER PUBLICATIONS

Korean Office Action dated Oct. 31, 2023 for Korean Appl. No. 10-2022-7035136.
European Search Report dated Mar. 14, 2024 for European Appl. No. 21772333.7.

\* cited by examiner

ELECTRIC VALVE AND ASSEMBLY METHOD THEREFOR

This disclosure is a national phase application of PCT international patent application no. PCT/CN2021/077996, filed on Feb. 26, 2021, which claims the benefit of priorities to the following two Chinese patent applications, both of which are incorporated herein by reference,
1) Chinese Patent Application No. 202010179491.6, titled "ELECTRIC VALVE AND ASSEMBLY METHOD THEREFOR", filed with the China National Intellectual Property Administration on Mar. 23, 2020; and
2) Chinese Patent Application No. 202020380324.3, titled "ELECTRIC VALVE AND ASSEMBLY METHOD THEREFOR", filed with the China National Intellectual Property Administration on Mar. 23, 2020.

FIELD

The present disclosure relates to an electric valve and an assembly method therefor.

BACKGROUND

An electric valve can be applied to a vehicle thermal management system or an air conditioning system. The electric valve includes a stator assembly, a rotor assembly and a sleeve which is located between the rotor assembly and the stator assembly. How to reduce the external moisture entering the stator assembly through a gap between the sleeve and the stator assembly is a technical problem.

SUMMARY

An electric valve is provided according to the present disclosure, which is beneficial to reducing the external moisture entering a stator assembly through a gap between a sleeve and the stator assembly. An assembly method for the electric valve is further provided according to the present disclosure.

To achieve the above object, the following technical solutions are provided according to the present disclosure:
an electric valve includes a stator assembly, a valve component, a valve body and a sleeve, the stator assembly is located at an outer circumference of the sleeve, the stator assembly is position-limitedly connected or fixedly connected to the valve body, the electric valve further includes a first sealing member, the stator assembly has a first recessed portion, at least part of an opening of the first recessed portion is arranged toward the valve body, the first sealing member is located in the first recessed portion, the first recessed portion is located at the outer circumference of the sleeve, and the first sealing member is located between the valve body and the stator assembly; the first recessed portion has a first mounting surface and a second mounting surface, an inner side portion of the first sealing member abuts against an outer circumferential surface of a side wall of the sleeve and an outer side portion of the first sealing member abuts against the second mounting surface in a radial direction; and a position of the first sealing member is position limited by the first mounting surface in an axial direction.

An assembly method for an electric valve includes the following steps:
assembling a valve component with a sleeve so as to form a sleeve assembly;
assembling the sleeve assembly with a valve body, position-limitedly connecting the sleeve assembly with the valve body by screwing a compression nut so as to form a valve seat assembly;
positon limiting a supporting pad to the compression nut;
assembling a first sealing member, which includes of sleeving the first sealing member from one end of the sleeve to abut against the supporting pad; and
positon-limitedly connecting a stator assembly with the valve body, which includes of fixedly connecting a pressure plate with the stator assembly, aligning a second cavity of the stator assembly with the sleeve, aligning a first recessed portion with a position of the first sealing member, pressing the stator assembly with a downward force until the stator assembly abuts against the valve body and the first recessed portion is located in the first recessed portion, and then position-limitedly connecting the pressure plate with the valve body with a screw.

In the electric valve according to the present disclosure, the first sealing member is arranged between the stator assembly and the valve component, and the position of the first sealing member is position limited by the first recessed portion formed in the stator assembly, the sleeve and the corresponding valve body, which is beneficial to reducing the external moisture entering the stator assembly through the gap between the stator assembly and the sleeve to a certain extent.

The assembly method for the electric valve according to the present disclosure is beneficial to the assembly of the first sealing member, which has a simple assembly process.

DETAILED DESCRIPTION OF THE EMBODIMENTS

The present disclosure will be further described as follows in conjunction with the drawings and specific embodiments.

FIGS. 1 to 7 show a first embodiment of an electric valve 100, the electric valve 100 can be used in a vehicle thermal management system or an air conditioning system for flow adjustment and on/off control of the system. The electric valve 100 includes a stator assembly 1, a circuit board 2, a valve component 3, a valve body 4, a rotor assembly 31 and a sleeve 9. The stator assembly 1 may be located at an outer circumference or an inner circumference of the rotor assembly 31. In this embodiment, the stator assembly 1 is located at the outer circumference of the rotor assembly 31, and the stator assembly 1 and the rotor assembly 31 can directly or indirectly drive the valve component 3 to move. The stator assembly 1 is located at an outer circumference of the sleeve 9, and the sleeve 9 is located between the stator assembly 1 and the rotor assembly 31. The stator assembly 1 is position-limitedly connected or fixedly connected to the valve body 4, and the stator assembly 1 is electrically connected or signally connected to the circuit board 2. The stator assembly 1 includes a winding 12 that is located inside the stator assembly 1. The valve component 3 includes a valve core 32 and a valve seat 33, and the electric valve further includes a valve port 331. In this embodiment, the valve port 331 is located in the valve seat 33. As other embodiment, the valve port may be directly arranged in the valve body, and the valve seat may be omitted. During the operation of the electric valve 100, the circuit board 2 controls the winding 12 of the stator assembly 1 to be energized and controls the current passing through the winding 12 to be varied according to a predetermined rule, so as to control the stator assembly 1 to generate a varying excitation magnetic field. The rotor assembly 31 rotates under the action of the excitation magnetic field, and the rotor assembly 31 is able to directly or indirectly drive the valve core 32 to move relative to the valve port 331 and adjust an opening degree of the valve port 331 in order to realize flow adjustment and on/off control of the system. It is explained herein that the stator assembly 1 located at the outer circumference of the sleeve 9 refers to that the stator assembly is located outside a wall of the sleeve, not in the wall of the sleeve. Other references to the outer circumference herein should be understood in the same way.

Figure 1:
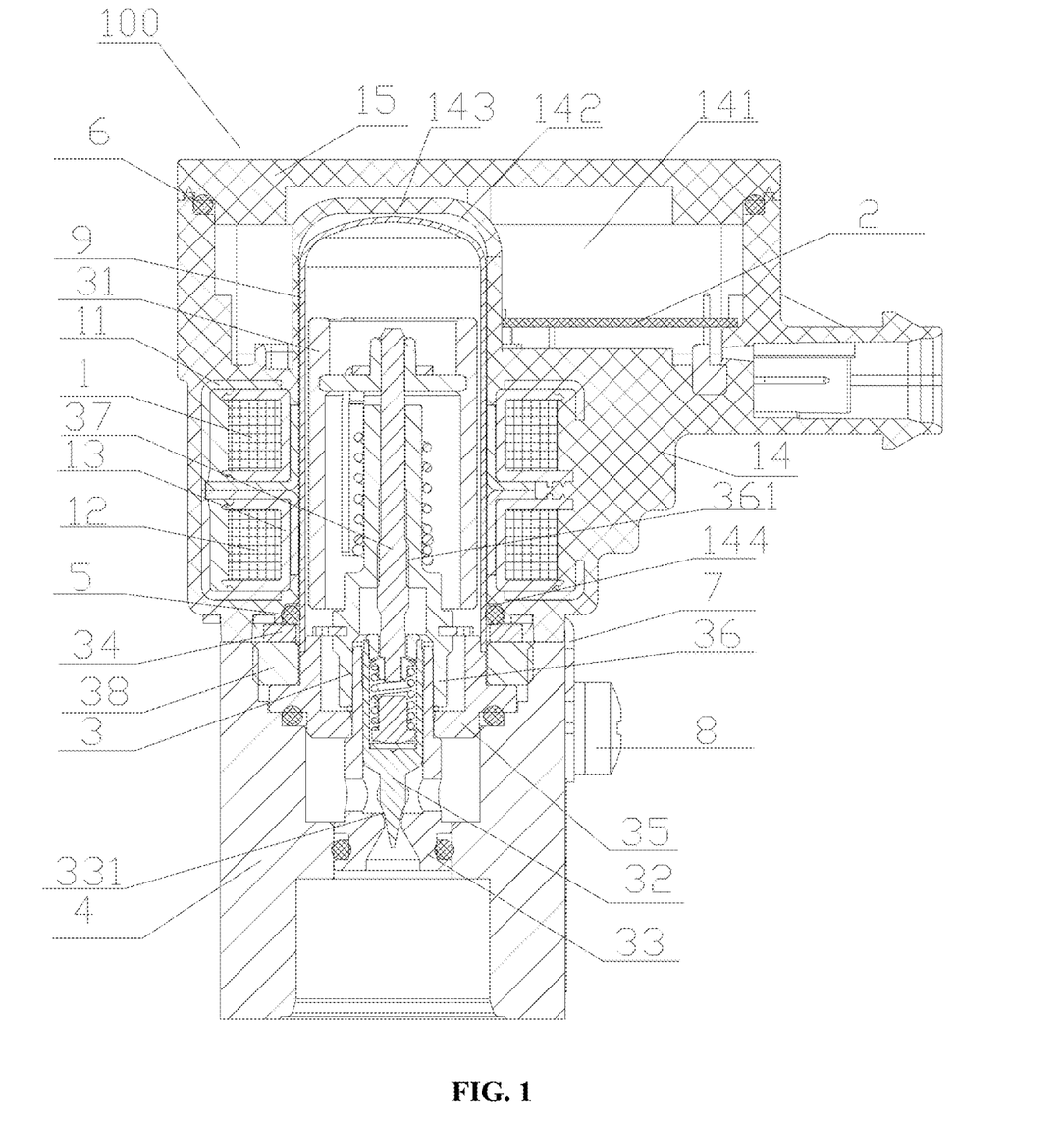
FIG. 1 is a schematic cross-sectional view of a first embodiment of an electric valve.

The stator assembly 1 further includes a stator housing 11, a frame 13, an injection molding portion 14, and the winding 12. The frame 13 is located inside the stator housing 11 and provides support for the winding 12, the injection molding portion 14 is integrally injection molded with the winding 12, the frame 13 and the stator housing 11 as inserts, the injection molding portion 14 has a first cavity 141 and a second cavity 142, which are not not in communication with each other. The first cavity 141 is located above the winding 12, the second cavity 142 is located in the middle of the stator assembly 1, and the first cavity 141 is separated from the second cavity 142 by a first cover 143 of the injection molding portion 14. The circuit board 2 is located in the first cavity 141, the winding 12 is electrically connected or signally connected to the circuit board 2, a cover plate 15 is provided above the first cavity 141, and the cover plate 15 is fixed to the injection molding portion 14 by welding. A second sealing ring 6 is arranged between the cover plate 15 and the injection molding portion 14 to seal the first cavity 141, so as to prevent external water vapor and impurities from entering the first cavity 141 and affecting the normal operation of the circuit board 2.

Figure 2:
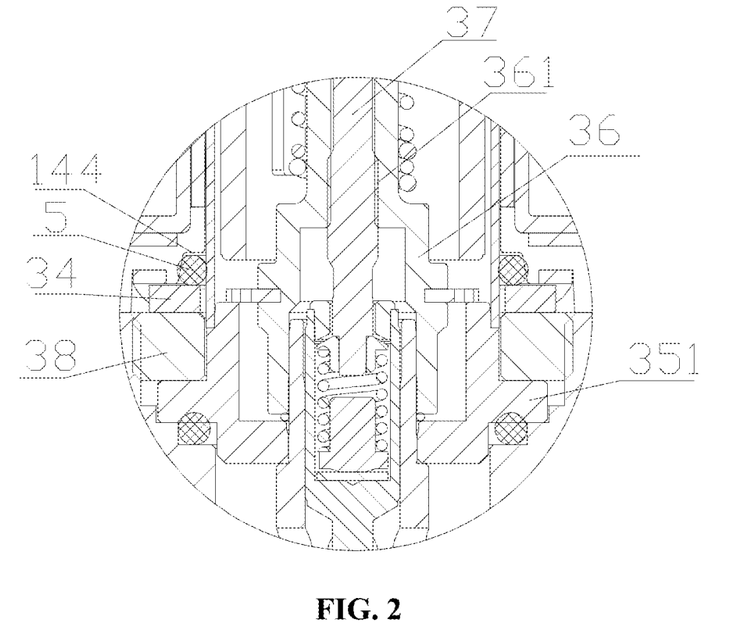
FIG. 2 is a schematic partially enlarged view of FIG. 1.

Referring to FIG. 2, the valve component 3 further includes a connecting member 35, a nut 36 and a screw rod 37, and at least part of the valve component 3 is located in the second cavity 142. The sleeve 9 is located in the second cavity 142, and part of the sleeve 9 is located between the rotor assembly 31 and the stator assembly 1, which plays an isolation role. The rotor assembly 31 is fixedly connected to one end of the screw rod 37. An inner wall of the nut 36 has an internal thread section 361, and the other end of the screw rod 37 passes through the nut 36 and is connected to the valve core 32. An outer circumferential wall of the screw rod 37 has an external thread section which is meshed with the internal thread section 361, the external thread of the screw rod 37 and the internal thread of the nut 36 cooperate with each other to convert a circumferential rotation of the rotor assembly into an axial movement of the valve core 32. In this embodiment, the nut 36 is fixedly connected to the connecting member 35, the valve seat 33 is connected to the connecting member 35, the valve seat 33 is located in the valve body 4, and at least part of the valve core 32 is located in the valve seat 33.

The electric valve further includes a compression nut 38. The connecting member 35 has a flange portion 351, a lower end surface of the flange portion 351 abuts against the valve body 4, the compression nut 38 is sleeved at a radial outer circumference of a main body side wall of the connecting member 35, the compression nut 38 is in contact with an upper end surface of the flange portion 351, and the compression nut 38 is threaded to the valve body 4, so that the connecting member 35 is fixedly connected with the valve body 4. The electric valve further includes a pressure plate 7, the stator assembly 1 is fixedly connected to the valve body 4 by the pressure plate 7, a cross section of the pressure plate 7 is substantially L-shaped, a part of the pressure plate 7 is fixedly connected to the stator assembly 1, and another part of the pressure plate 7 is fixedly connected to the valve body 4 by means of screw connection and the like. When the stator assembly 1 of the electric valve generates an excitation magnetic field, the rotor assembly 31 drives the screw rod 37 to rotate together under the action of the excitation magnetic field, while the screw rod 37 threadedly cooperates with the nut 36 to drive the valve core 32 to move axially. The valve core 32 changes a flow cross-sectional area of the working medium at the valve port 331 by approaching or moving away from the valve port 331, thereby forming throttling and/or on/off of the working medium at the valve port 331.

Figure 3:
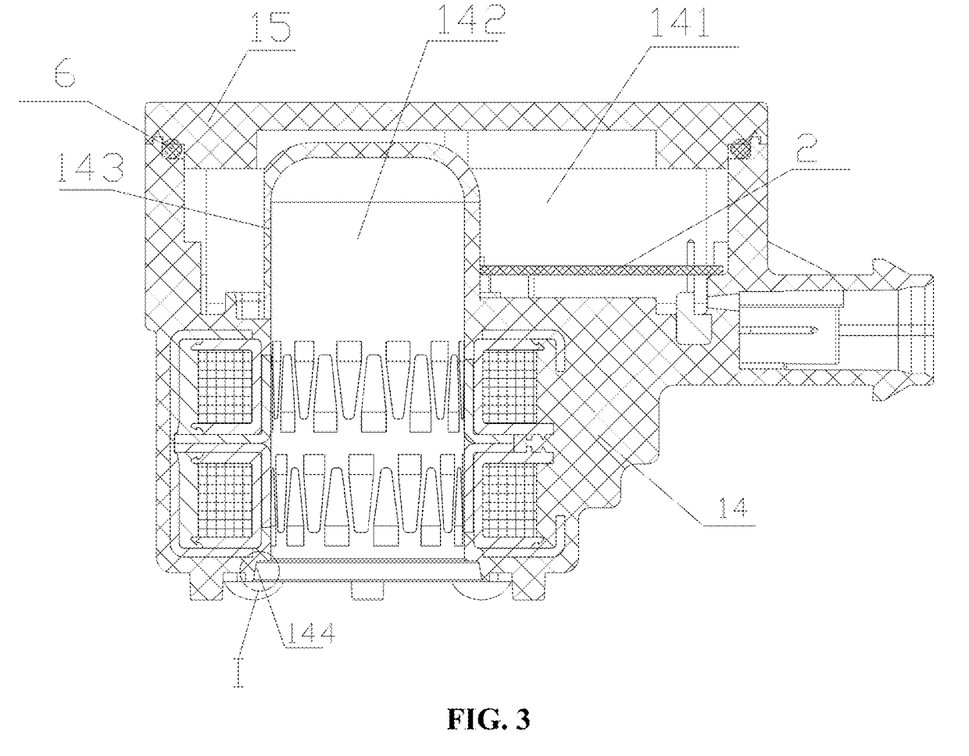
FIG. 3 is a schematic cross-sectional view of a stator assembly.
Figure 4:
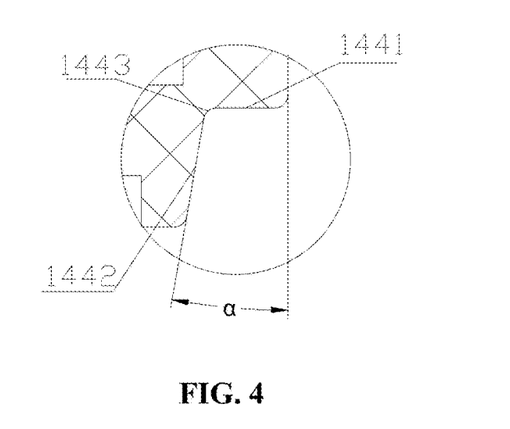
FIG. 4 is a partially enlarged view of I portion in FIG. 3.

Referring to FIG. 1 to FIG. 4, the stator assembly 1 further has a first recessed portion 144 that is located in the injection molding portion 14, the first recessed portion 144 is formed by injection molding, and at least part of an opening of the first recessed portion 144 is arranged toward the valve body 4. Viewed from a radial direction of the electric valve, the first recessed portion 144 is located between the valve component 3 and the stator assembly 1; and viewed from an axial direction of the electric valve, the first recessed portion 144 is located between the valve body 4 and the stator assembly 1. Specifically, the first recessed portion 144 is located at a position where the injection molding portion 14 is close to the valve body 4 and the sleeve 9, and the first recessed portion 144 is located at the outer circumference of the sleeve 9. The electric valve 100 further includes a supporting pad 34 and a first sealing member 5, and the supporting pad 34 is position-limitedly connected or fixedly connected to the compression nut 38. Viewed from the axial direction of the electric valve, the first recessed portion 144 is located between the supporting pad 345 and the injection molding portion 14; viewed from the radial direction of the electric valve, the first recessed portion 144 is located between the sleeve 9 and the injection molding portion 14, and the first sealing member 5 is located within the first recessed portion 144. In this embodiment, the first sealing member 5 is an O-shaped ring. As other embodiments, the first sealing member 5 may be an irregular sealing ring or a sealing assembly formed by two or more sealing members. Referring to FIG. 4, the first recessed portion 144 has a first mounting surface 1441, a second mounting surface 1442 and a connecting portion 1443, the first mounting surface 1441 is substantially perpendicular to the main body side wall of the sleeve 9, the first mounting surface 1441 is arranged opposite to the valve body 4, the second mounting surface 1442 is arranged opposite to an outer circumferential surface of the main body side wall of the sleeve 9, the second mounting surface 1442 is connected to the first mounting surface 1441 by the connecting portion 1443, which is arc-shaped. Of course, the first recessed portion 144 may not be provided with the connecting portion, and the second mounting surface 1442 may be directly connected to the first mounting surface 1441. In the radial direction, an outer side portion of the first sealing member 5 abuts against the second mounting surface 1442 and an inner side portion of the first sealing member 5 abuts against the outer circumferential surface of the side wall of the sleeve 9. In the axial direction, a position of the first sealing member 5 is limited by the first mounting surface 1441, the first sealing member 5 is located above the supporting pad 34 and abuts against an upper surface of the supporting pad 34, and the first sealing member 5 is deformed by extrusion of the sleeve 9, the stator assembly 1 and the valve body 4. The supporting pad 34 is supported on the compression nut 38, which is fixedly connected to the valve body, and the first sealing member 5 is supported on the supporting pad 34, that is, part of the first sealing member 5 is indirectly position-limited to the valve body 4, and the valve body 4 provides at least partial support for the first sealing member 5.

Figure 5:
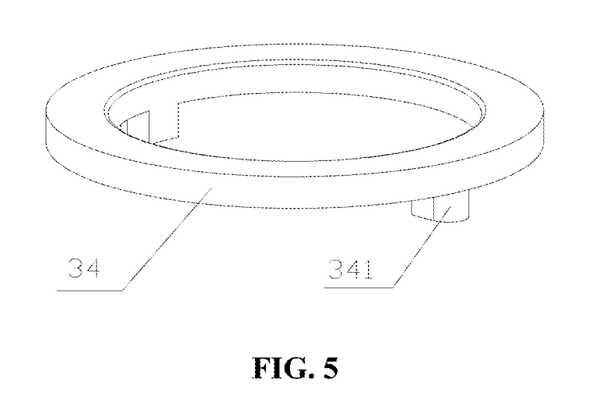
FIG. 5 is a schematic perspective view of a supporting pad.
Figure 6:
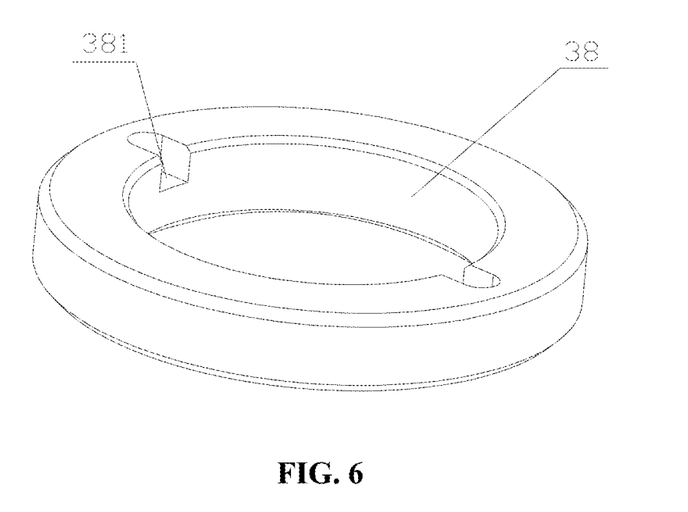
FIG. 6 is a schematic perspective view of a compression nut.

A structure of the compression nut 38 is as shown in FIG. 6, an external thread (not shown in the FIG. 6) is formed on an outer circumferential wall of the compression nut 38, and the compression nut 38 has two second recessed portions 381. A function of these two second recessed portions 381 is that a tooling can act on the two second recessed portions 381 during assembly so as to threadedly fix the compression nut 38 to the valve body 4. In order to change the structure of the original electric valve as little as possible, the supporting pad 34 is provided in this embodiment based on the structure of the compression nut 38, and the structure of the supporting pad 34 is as shown in FIG. 5. The supporting pad 34 mainly supports the first sealing member 5, so that the first sealing member 5 indirectly abuts against the valve body 4, and the first sealing member 5 is more stable and firm. In order to limit the rotation of the supporting pad 34 relative to the compression nut 38, a lower end of the supporting pad 34 further has two positioning bosses 341, the two positioning bosses 341 are matched with the second recessed portions 381 of the compression nut 38, and the positioning bosses 341 of the supporting pad are pressed into the second recessed portions 381 of the compression nut 38, which can limit a position of the supporting pad 34, and reduce the damage to the first sealing member 5 caused by the shaking or rotation of the supporting pad 34 during the vibration of the electric valve.

The first mounting surface 1441 and the second mounting surface 1442 are flat surfaces in this embodiment, an included angle α is formed between the second mounting surface 1442 and the main body side wall of the sleeve, and the included angle α is greater than 0 degree and is less than 90 degrees. The second mounting surface 1442 is located on a side away from the sleeve 9. In the direction shown in the drawings, one end, close to the winding 12, of the first recessed portion 144 is narrow, and the other end, close to the supporting pad 34 of the valve body 4, of the first recessed portion 144 is wide, showing a structure with a narrow upper end and a wide lower end. In the structure of the electric valve shown in FIG. 1, in order to keep the other structural dimensions of the electric valve unchanged as much as possible and meet the requirement that the first sealing member 5 reaches a certain compression rate, such as a compression rate ranging from 25% to 35%, the included angle α can be selected to range from 5 degrees to 18 degrees under the condition that the structural constraints are satisfied. The included angle α can be adjusted according to the structural dimensions of different electric valves.

Specially, the included angle α in FIG. 4 is 10 degrees, and some lines existing in FIG. 3 are omitted in FIG. 4. Of course, the first mounting surface 1441 and the second mounting surface 1442 are not limited to flat surfaces (the flat surfaces herein are generalized flat surfaces, including smooth flat surfaces, flat surfaces with roughness observed by the naked eye, etc.), or may be curved surfaces with radians, in this case the included angle α between the second mounting surface and the main body side wall of the sleeve is an included angle between a tangent plane of the second mounting surface and the main body side wall of the sleeve.

An assembly method for the above electric valve is further provided according to the present disclosure, which includes the following steps:

assembling the valve component 3 with the sleeve 9 to form a sleeve assembly;

assembling the sleeve assembly with the valve body 4, and position-limitedly connecting the sleeve assembly with the valve body 4 by screwing the compression nut 38 to form a valve seat assembly; the specific operations of the assembling the sleeve assembly with the valve body 4, and position-limitedly connecting the sleeve assembly with the valve body 4 by screwing the compression nut 38 to form a valve seat assembly are in that: sleeving the compression nut 38 from an upper end of the sleeve 9 to abut against the valve body 4, and threadedly fixing the compression nut 38 to the valve body 4 by acting on second recessed portions 381 of the compression nut 38 with a tooling, so as to fix the valve body 4 to the sleeve assembly.

Position limiting the supporting pad to the compression nut; the specific operation of the limiting the supporting pad to the compression nut is in that: sleeving the supporting pad 34 from the upper end of the sleeve 9 to contact with the compression nut 38, and inserting positioning bosses 341 of the supporting pad 34 into the second recessed portions 381 of the compression nut 38 to position limit the supporting pad 34 to the compression nut 38.

The assembly of the first sealing member includes sleeving the first sealing member 5 from the upper end of the sleeve 9 to abut against the supporting pad 34.

The position-limitedly connecting the stator assembly with the valve body includes: fixedly connecting the pressure plate 7 with the stator assembly 1, aligning the second cavity 142 of the stator assembly 1 with the sleeve 9, aligning the first recessed portion 144 with a position of the first sealing member 5, pressing the stator assembly 1 with a downward force until the stator assembly 1 abuts against the valve body 4 and the first recessed portion 5 is located within the first recessed portion 144, and then fixedly connecting the pressure plate 7 with the valve body 4 with a screw 8.

The assembly of the electric valve further includes the following step: completing the assembly of the stator assembly 1 with the circuit board 2, and sealing a cover plate 15 to an injection molding portion 14 by a second sealing ring 6 and fixing the cover plate 15 to the injection molding portion 14 by welding, and this step is performed before or after the stator assembly is position-limitedly connected with the valve body.

By arranging the included angle α in this embodiment, it is convenient to discharge the air in the first recessed portion 144 during pressing the first sealing member 5 into the first recessed portion 144, which reduces the assembly difficulty and reduces the wear of the first sealing member 5 during assembly. The assembled first sealing member 5 can isolate the metal material in the injection molding portion 14 of the stator assembly from the external environment to a certain extent, reduce the possibility of external moisture or impurities entering the stator assembly 1, and reduce the risk of corrosion of metal materials such as the winding 12 and the stator housing 11 and damage to the circuit board 2. If the second mounting surface 1442 of the first recessed portion 144 does not deviate from the sleeve by the included angle α, when the stator assembly 1 is sleeved down toward the valve seat assembly during mounting the stator assembly 1, it is prone to form an air spring between the first recessed portion 144 of the stator assembly and the valve seat assembly, and thus it is more and more difficult to sleeve the stator assembly 1 down. The formed air spring may cause the stator assembly and the valve seat assembly to have a mutual disengagement force for a long time after the stator assembly 1 is assembled with the valve seat assembly and the screw 8 of the pressure plate 7 is screwed tightly, so that the pressure plate 7, which fixes the stator assembly 1 to the valve body 4, will continue to be stressed. In the long term, the pressure plate 7 will deform and the relative distance between the stator assembly and the valve seat assembly will become larger.

Figure 7:
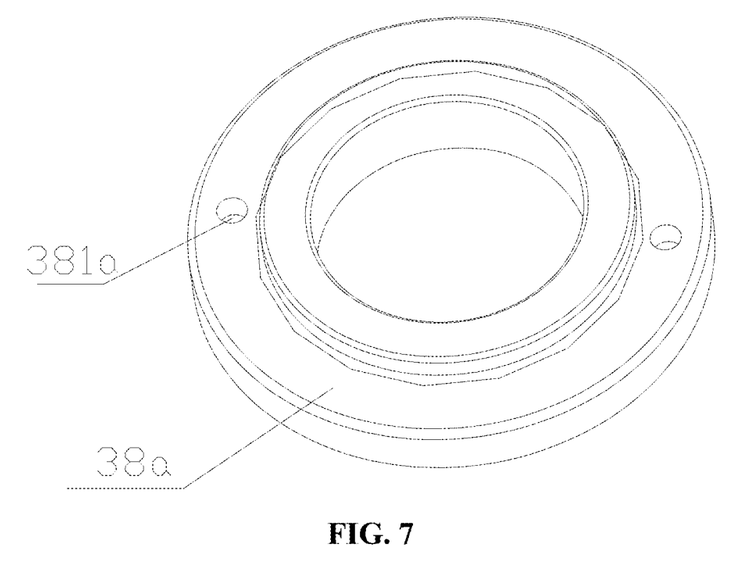
FIG. 7 is a schematic perspective view of a second embodiment of the compression nut and the supporting pad.

A second embodiment of the electric valve is further provided according to the present disclosure, different from the first embodiment, the compression nut 38 and the supporting pad 34 in this embodiment are integrally configured, as shown in FIG. 7, the compression nut and the supporting pad in integral configuration herein refer to as an integral member 38*a*, a lower end of which is equivalent to the compression nut in the first embodiment, an upper end of which is equivalent to the supporting pad in the first embodiment. The whole integral member is also provided with two second recessed portions 381*a*, which have the same function with the second recessed portions 381 in the first embodiment. During assembly, the tooling can act on the two second recessed portions 381*a* to threadedly fix the integral member 38*a* to the valve body 4. By configure the compression nut and the supporting pad into the integral member, the assembly steps can be simplified (the position limit connection between the supporting pad and the compression nut can be omitted), and the assembly efficiency can be improved.

A corresponding assembly method for the electric valve includes the following steps:

assembling the valve component 3 with the sleeve to form a sleeve assembly, assembling the sleeve assembly with the valve bod 4, and position-limitedly connecting the sleeve assembly with the valve body 4 by screwing an integral member 38*a* to form a valve seat assembly, assembling of the first sealing member, which includes: sleeving the first sealing member 5 from the upper end of the sleeve 9 of the sleeve 9 to abut against an upper end (equivalent to the supporting pad in the first embodiment) of the integral member 38*a*;

position-limitedly connecting the stator assembly with the valve body, which includes: fixedly connecting the pressure plate 7 with the stator assembly 1, aligning the second cavity 142 of the stator assembly 1 with the sleeve 9, aligning the first recessed portion 144 with a position of the first sealing member 5, pressing the stator assembly 1 with a downward force until the stator assembly 1 abuts against the valve body 4 and the first recessed portion 5 is located in the first recessed portion 144, and then fixedly connecting the pressure plate 7 with the valve body 4 with a screw 8.

Figure 8:
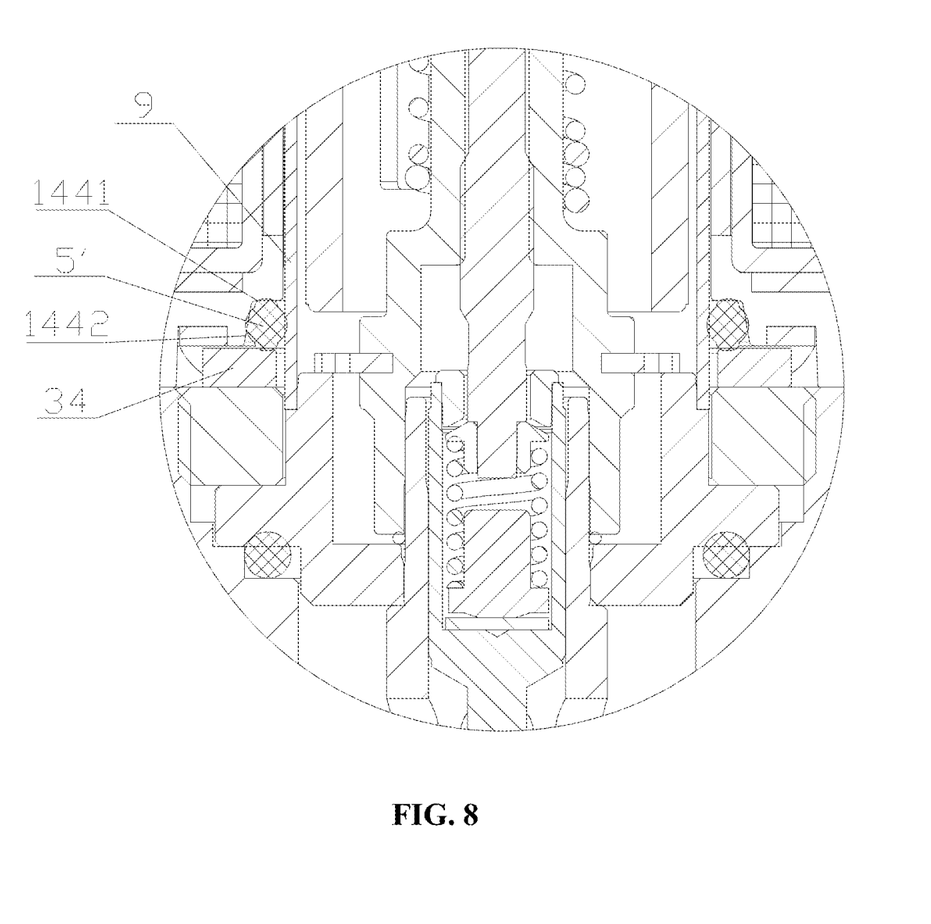
FIG. 8 is a schematic partially enlarged view of a third embodiment of the electric valve.

Referring to FIG. 8, FIG. 8 shows a third embodiment of the present disclosure, compared with the first embodiment, the first sealing member 5' in this embodiment is an irregular sealing ring, a cross-sectional shape of the first seal 5' is shown in FIG. 8, and an outer contour of this cross section is formed by four arcs. It can be understood that, the first sealing member 5' is not limited to the shape shown in FIG. 8, and may be other regular or irregular sealing members. A top of the first sealing member 5' abuts against the first mounting surface 1441 and is position limited by the first mounting surface 1441, an outer side portion of the first sealing member 5' abuts against the second mounting surface 1442, an inner side portion of the first sealing member 5' abuts against the outer circumferential surface of the side wall of the sleeve 9, and a bottom of the first sealing member 5' abuts against the supporting pad 34.

The above embodiments are only used to illustrate the present application rather than limit the technical solutions described in the present application. Although the present application is described in detail in this specification with reference to the above embodiments, those of ordinary skill in the art should understand that those skilled in the art may still modify or equivalently replace the present application, and all technical solutions and improvements thereof that do not depart from the spirit and scope of the present application shall be covered within the scope of the claims of the present application.

What is claimed is:

1. An electric valve, comprising a stator assembly, a valve component, a valve body and a sleeve, wherein the stator assembly is located at an outer circumference of the sleeve, the stator assembly is position-limitedly connected or fixedly connected to the valve body, wherein the electric valve further comprises a first sealing member, the stator assembly has a first recessed portion, at least part of an opening of the first recessed portion is arranged toward the valve body, the first sealing member is located in the first recessed portion, the first recessed portion is located at the outer circumference of the sleeve, and the first sealing member is located between the valve body and the stator assembly; the first recessed portion has a first mounting surface and a second mounting surface, wherein, in a radial direction; an inner side portion of the first sealing member abuts against an outer circumferential surface of a side wall of the sleeve, and an outer side portion of the first sealing member abuts against the second mounting surface, and in an axial direction, a position of the first sealing member is limited by the first mounting surface, wherein the electric valve further comprises a compression nut and a supporting pad, the valve body is position-limitedly connected to the valve component through the compression nut, the sleeve is position-limitedly connected to the valve component, the supporting pad is located at an upper end of the compression nut, the supporting pad is position-limitedly connected to the compression nut or the supporting pad and the compression nut form an integral member, a part of the opening of the first recessed portion is arranged toward the supporting pad, and a lower end surface of the first sealing member abuts against the supporting pad.

2. The electric valve according to the claim 1, wherein an included angle is formed between the second mounting surface and the side wall of the sleeve, the included angle is greater than 0 degree and is less than 90 degrees, the second mounting surface is arranged opposite to the outer circumferential surface of the side wall of the sleeve, and the first mounting surface is arranged opposite to the valve body.

3. The electric valve according to claim 2, wherein the stator assembly further comprises a stator housing, a winding, a frame, and an injection molding portion, the winding is located inside the stator housing, the frame provides support for the winding, the injection molding portion is integrally injection molded with the winding, the frame and the stator housing as inserts, and the first recessed portion is located in the injection molding portion.

4. The electric valve according to claim 1, wherein an included angle is formed between the second mounting surface and the side wall of the sleeve, the included angle is greater than 5 degrees and is less than or equal to 18 degrees, the second mounting surface is arranged opposite to the outer circumferential surface of the side wall of the sleeve, and the first mounting surface is arranged opposite to the valve body.

5. The electric valve according to claim 4, wherein the stator assembly further comprises a stator housing, a winding, a frame, and an injection molding portion, the winding is located inside the stator housing, the frame provides support for the winding, the injection molding portion is integrally injection molded with the winding, the frame and the stator housing as inserts, and the first recessed portion is located in the injection molding portion.

6. The electric valve according to claim 1, wherein the supporting pad is position-limitedly connected to the compression nut, an outer circumferential wall of the compression nut has an external thread, the valve body has an internal thread, the compression nut is threaded to the valve body; the compression nut further has at least two second recessed portions, the supporting pad has at least two protrusions, and the at least two second recessed portions are matched with the at least two protrusions to position limit a position of the supporting pad.

7. The electric valve according to claim 6, wherein the stator assembly further comprises a stator housing, a winding, a frame, and an injection molding portion, the winding is located inside the stator housing, the frame provides support for the winding, the injection molding portion is integrally injection molded with the winding, the frame and the stator housing as inserts, and the first recessed portion is located in the injection molding portion.

8. The electric valve according to claim 1, wherein the supporting pad and the compression nut form the integral member, an outer circumferential wall of the integral member has an external thread, the valve body has an internal thread, the integral member is threaded to the valve body; the integral member further has at least two second recessed portions, and the lower end surface of the first sealing member abuts against the integral member.

9. The electric valve according to claim 8, wherein the stator assembly further comprises a stator housing, a winding, a frame, and an injection molding portion, the winding is located inside the stator housing, the frame provides support for the winding, the injection molding portion is integrally injection molded with the winding, the frame and the stator housing as inserts, and the first recessed portion is located in the injection molding portion.

10. The electric valve according to claim 1, wherein the stator assembly further comprises a stator housing, a winding, a frame, and an injection molding portion, the winding is located inside the stator housing, the frame provides support for the winding, the injection molding portion is integrally injection molded with the winding, the frame and the stator housing as inserts, and the first recessed portion is located in the injection molding portion.

11. The electric valve according to claim 1, wherein the stator assembly further comprises a stator housing, a winding, a frame, and an injection molding portion, the winding is located inside the stator housing, the frame provides support for the winding, the injection molding portion is integrally injection molded with the winding, the frame and the stator housing as inserts, and the first recessed portion is located in the injection molding portion.

12. The electric valve according to the claim 10, wherein the injection molding portion has a first cavity and a second cavity, the first cavity is separated from the second cavity by a cover of the injection molding portion; wherein the electric valve further comprises a circuit board, the circuit board is located in the first cavity, the circuit board is electrically connected or signally connected to the winding; at least part of the second cavity is located in the middle of the stator assembly, and at least part of the sleeve is located in the second cavity.

13. The electric valve according to the claim 11, wherein the injection molding portion has a first cavity and a second cavity, the first cavity is separated from the second cavity by a cover of the injection molding portion; wherein the electric valve further comprises a circuit board, the circuit board is located in the first cavity, the circuit board is electrically connected or signally connected to the winding; at least part of the second cavity is located in the middle of the stator assembly, and at least part of the sleeve is located in the second cavity.

14. An assembly method for an electric valve, comprising the following steps:
   assembling a valve component with a sleeve to form a sleeve assembly;
   assembling the sleeve assembly with a valve body, and position-limitedly connecting the sleeve assembly with the valve body by screwing a compression nut so as to form a valve seat assembly;
   position limiting a supporting pad to the compression nut;
   assembling a first sealing member, which includes of sleeving the first sealing member from one end of the sleeve to abut against the supporting pad; and
   position-limitedly connecting a stator assembly with the valve body, which includes of fixedly connecting a pressure plate with the stator assembly, aligning a second cavity of the stator assembly with the sleeve, aligning a first recessed portion with a position of the first sealing member, pressing the stator assembly with a downward force until the stator assembly abuts against the valve body and the first sealing member is located in the first recessed portion, and then position-limitedly connecting the pressure plate with the valve body with a screw.

15. The assembly method according to claim 14, wherein: the first recessed portion is formed in the stator assembly, the first recessed portion has a first mounting surface and a second mounting surface, the first mounting surface is opposite to the valve body, the second mounting surface is opposite to a side wall of the sleeve, the first sealing member abuts against the second mounting surface, and an included angle between the second mounting surface and the side wall of the sleeve is greater than 5 degrees and less than or equals to 18 degrees.

16. The assembly method according to claim 14, wherein the position limiting a supporting pad to the compression nut includes: sleeving the supporting pad from an upper end of the sleeve so as to contact with the compression nut, and inserting positioning bosses of the supporting pad into second recessed portions of the compression nut so as to position limit the supporting pad to the compression nut.

17. The assembly method according to claim 14, wherein: the assembling the sleeve assembly with a valve body, and position-limitedly connecting the sleeve assembly with the valve body by screwing a compression nut to form a valve seat assembly comprises: sleeving the compression nut from an upper end of the sleeve until the compression nut abuts against the valve body, and threadedly fixing the compression nut to the valve body by acting on second recessed portions of the compression nut with a tooling.

18. The assembly method according to claim 14, further comprising a step of completing the assembly of the stator assembly and a circuit board, and sealing a cover plate to an injection molding portion of the stator assembly by a second sealing ring and fixing the cover plate to the injection molding portion of the stator assembly by welding, wherein the step is performed before or after the stator assembly is position-limitedly connected with the valve body.

* * * * *